United States Patent
Hahn et al.

(10) Patent No.: US 8,531,467 B1
(45) Date of Patent: *Sep. 10, 2013

(54) SYSTEMS AND METHODS FOR CREATING AND USING MODELESS ANIMATION MANIPULATION RIGS

(75) Inventors: Tom Hahn, Emeryville, CA (US);
Robert Russ, Emeryville, CA (US);
Steven Clay Hunter, Emeryville, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,482

(22) Filed: Aug. 20, 2012

Related U.S. Application Data

(63) Continuation of application No. 12/050,740, filed on Mar. 18, 2008, now Pat. No. 8,253,745.

(51) Int. Cl.
*G06T 13/00* (2011.01)

(52) U.S. Cl.
USPC .......................................... 345/474

(58) Field of Classification Search
USPC .................................. 345/648, 473, 474
See application file for complete search history.

(56) References Cited

U.S. PATENT DOCUMENTS

| | | | |
|---|---|---|---|
| 6,714,201 B1 * | 3/2004 | Grinstein et al. | 345/474 |
| 7,312,805 B1 * | 12/2007 | Worthington | 345/647 |
| 7,583,276 B1 * | 9/2009 | Worthington | 345/647 |
| 7,594,180 B1 * | 9/2009 | Langmacher et al. | 715/762 |
| 8,253,745 B1 * | 8/2012 | Hahn et al. | 345/474 |

* cited by examiner

*Primary Examiner* — Ryan R Yang
(74) *Attorney, Agent, or Firm* — Kilpatrick Townsend & Stockton LLP

(57) ABSTRACT

Users define object control rigs that can be used to perform specific object manipulation tasks for the user when manipulating objects in a scene. Different rigs can be constructed for the same set of animation objects to perform different tasks. A rig is modeless in that a rig may include an arbitrary user-selected mixture of object control elements that are typically used in different modes and scopes of manipulation. When a user selects a rig, all of the visual representations of the object control elements specified for that rig are enabled to be displayed proximal the object(s) with which the control elements are associated. No additional selection of object parts is necessarily required to determine which control elements are associated with the object(s). The user may manipulate the object(s) using a displayed visual representation of an object control element.

20 Claims, 3 Drawing Sheets

SYSTEMS AND METHODS FOR CREATING AND USING MODELESS ANIMATION MANIPULATION RIGS

CROSS-REFERENCES TO RELATED APPLICATIONS

This application is a Continuation of U.S. patent application Ser. No. 12/050,740, filed Mar. 18, 2008 and entitled "Sytems and Methods for Creating and Using Modeless Animation Manipulation Rigs," which is incorporated herein by reference in its entirety for all purposes.

BACKGROUND

The present invention relates generally to computer graphics and animation. More specifically, the present invention is related to systems and methods for creating and using modeless animation control rigs.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

As part of the animation modeling process, it is desirable to directly manipulate objects in a scene to better ensure proper positioning and orientation of objects when an animated scene is displayed. Many current tools exist to facilitate manipulation of objects in a scene. Typically these tools use object control elements to facilitate manipulation of an object. Different object control elements enable different manipulation tasks, such as for example translation, rotation or stretching of a model object.

Prior systems provide tools that allow manipulation of model objects in a scene. These systems typically are shipped with default object control elements tailored to specific tasks. Further, these prior systems are modal, meaning that certain object control elements are only enabled when certain modes of manipulation are selected. For example, certain object control elements may only be usable in a translate mode, and others may only be usable in a rotate mode. This requires users to switch between modes of manipulation to access and use desired object control elements. This can be tedious and inefficient for users desiring to manipulate an object, especially where different object control element types need to be used during a manipulation.

Therefore it is desirable to provide systems and methods that overcome the above and other problems and/or that reduce some of the drawbacks of prior systems.

BRIEF SUMMARY

The present invention provides systems and methods for custom designing modeless rigs or sets of object control elements that can be used when manipulating one or more objects.

The present invention allows users to define object control rigs that can be used to perform specific object manipulation tasks for the user when manipulating objects in a scene. Different rigs can be constructed for the same set of animation objects to perform different tasks. A rig is modeless in that a rig may include an arbitrary user-selected mixture of object control elements that are typically used in different modes of manipulation. For example, a rig may at the same time include one or more control elements typically used in a translation mode and one or more control elements typically used in a rotation mode. When a user selects a rig, all of the visual representations of the object control elements specified for that rig are enabled to be displayed proximal the object(s) with which the control elements are associated. No additional selection of object parts is necessarily required to determine which control elements are associated with the object(s). For example, an enabled control element may be displayed upon a mouse over of an object by the user, or it may be displayed automatically upon selection of the rig. Alternatively, an enabled control element may be displayed upon selection of an object. The user may manipulate the object(s) using a displayed visual representation of an object control element.

According to one embodiment, a computer-implemented method of displaying user-selectable object control elements in an animation object manipulation tool is provided. The method typically includes receiving user input specifying a set of two or more object control elements to be associated with one or more animation objects, each object control element having an associated visual representation, wherein the specified set includes an arbitrary mixture of object control element types, and responsive to a user selection of the set, enabling the visual representations associated with the selected set of object control elements to be displayed. The method also typically includes displaying one or more of the visual representations responsive to a user action, whereupon a user is able to manipulate an object or objects using a displayed visual representation of an object control element. In certain aspects, the user action includes a mouse over of an object or a selection of an object or the selection of the set.

According to one embodiment, a computer-implemented method of enabling user-selectable object control elements in an animation object manipulation tool is provided. The method typically includes associating a set of two or more object control elements with one or more animation objects, wherein the set includes a first object control element of a first type and a second object control element of a second type, and responsive to a selection of the set, enabling the set of object control elements for use in manipulating the one or more animation objects. In certain aspects, each object control element has an associated visual representation, and enabling includes displaying one or more of the visual representations responsive to a user action, whereupon a user is able to manipulate an object using a displayed visual representation of an object control element. In certain aspects, the first and second object control element types includes different object control element types that are intended to be used in different operation modes.

According to another embodiment, a computer readable medium is provided that stores code for controlling one or more processors to enable user-selectable object control elements in an animation object manipulation tool. The code typically includes instructions to associate a set of two or more object control elements with one or more animation objects, wherein the set includes a first object control element of a first type and a second object control element of a second type, and responsive to a selection of the set, enable the set of object control elements for use in manipulating the one or more animation objects. In certain aspects, the selection of a set includes a mouse-over of an object or a user selection of an object or the set.

According to yet another embodiment, a computer-implemented method of displaying user-selectable object control elements is provided. The method typically includes specifying multiple sets of object control elements, each set including multiple object control elements associated with one or more animation objects, each object control element having an associated visual representation, and responsive to a user selection of a set, enabling the visual representations associated with the selected set of object control elements to be displayed. The method also typically includes displaying one or more of the visual representations of the selected set responsive to a user action, whereupon a user is able to manipulate an object or objects using a displayed visual representation of an object control element. In certain aspects, the user action includes a mouse over of an object or a selection of an object or the selection of the set.

According to yet a further embodiment, a system for enabling a set of user-selectable object control elements in a modeling and animation tool is provided. The system typically includes a processor and a memory coupled to the processor. The memory is typically configured to store a set of instructions which, when executed by the processor, cause the processor to associate a set of two or more object control elements with one or more animation objects, wherein the set includes a first object control element of a first type and a second object control element of a second type, and responsive to a selection of the set, to enable the set of object control elements for use in manipulating the one or more animation objects.

According to another embodiment, a computer-implemented method is provided for enabling user-selectable object control elements in an animation object manipulation tool. The method typically includes selecting a first object control element of a first type, selecting a second object control element of a second type different than the first type, and associating the first and second object control elements with one or more animation objects. The method also typically includes enabling the first and second object control elements for use in manipulating the one or more animation objects. For example, in one aspect, the first object control element may be an element that controls rotation, and the second control element may be an element that controls translation. The one or more objects typically are included in the same image frame. In this manner, the user may manipulate the one or more objects with the first and second animation control elements without having to switch modes of manipulation.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
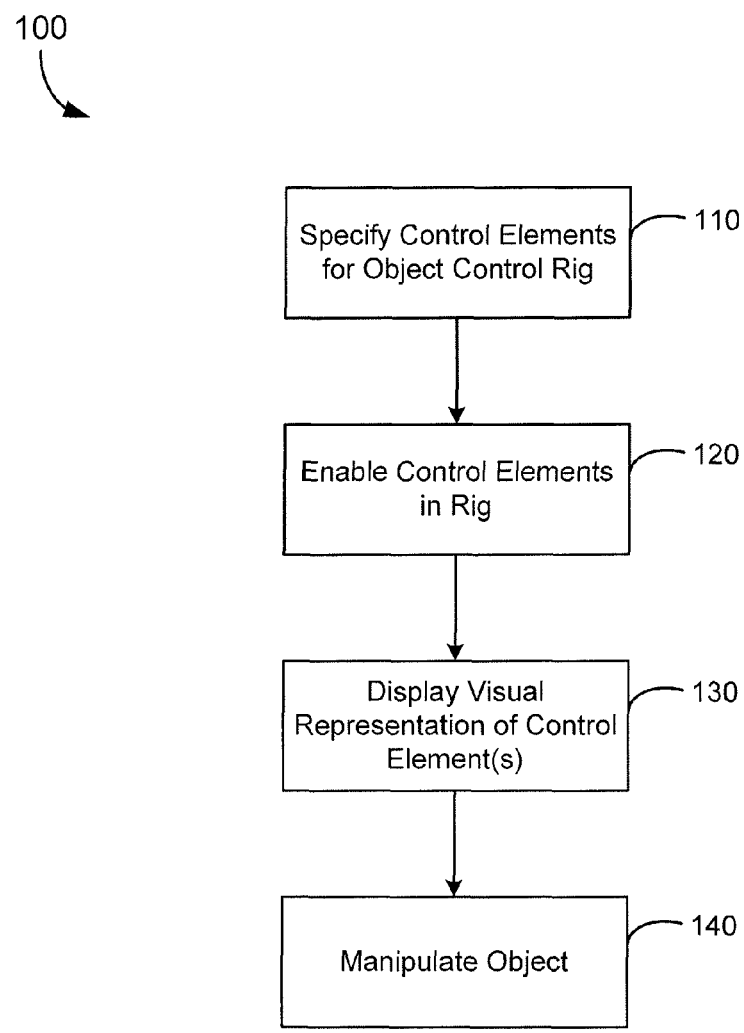
FIG. 1 illustrates a method of setting up an object control rig, and enabling and displaying user-selectable object control elements in an animation object manipulation tool according to one embodiment.

The present invention provides systems and methods for specifying one or more sets, or rigs, of object control elements that can be selected to facilitate manipulation of objects in a scene.

The present invention allows users to define object control rigs that can be used to perform specific object manipulation tasks for the user in a model object manipulation tool. As used herein, a rig is a set of object control elements specified for a set of one or more animation objects. Each object control element typically has an associated visual representation that may be displayed proximal to the object part with which that object control element has been associated. For example, the visual representation may be displayed directly on the object part or to the side of the object part with which it is associated. One example of a visual representation would be a slider for a control element designed to translate an object; another example would be a circle or other angle element for a control element designed to rotate an object. A visual representation of a control element can be purely functional. For example, a visual representation can provide an ability to manipulate an object and/or it can provide feedback on the extent of a current manipulation. An example of the latter would be an indicator showing the direction and amount of angular rotation made when a user selects a rotation control element and manipulates an object using that control element. A control element can include one or more animation control variables.

Different rigs can be constructed for the same set of animation objects. For example, different rigs may be constructed by an object animator, an object modeler or other user to perform different tasks. Also, the same rig can be associated with a different set of animation objects, such as different characters in the same or different animation frames. In certain aspects, a rig is modeless; that is, a rig may include an arbitrary mixture of object control elements that are typically used in different modes of manipulation in a model object manipulation tool. For example, a rig may at the same time include one or more control elements typically used in a translation mode and one or more control elements typically used in a rotation mode. When a user selects a rig, all of the object control elements specified for that rig are enabled for use in manipulating the associated object(s). For example, in certain aspects, all of the visual representations of the object control elements specified for that rig are enabled to be displayed proximal the object(s) so that no additional selection of object parts is necessarily required to determine which control elements are associated with the object(s). For example, a representation of an enabled control element may be displayed upon a mouse over of an object by the user, or it may be automatically displayed upon selection of the rig. Alternately, an enabled control element may be displayed upon a selection of an object. The user may manipulate the object(s) using a displayed visual representation of an object control element.

FIG. 1 illustrates a method 100 of setting up an object control rig, and enabling and displaying user-selectable object control elements in an animation object manipulation tool according to one embodiment. In step 110, a user specifies an arbitrary set of one or more object control elements to be included in an object control rig. For example, a user may select one or more control elements from one or more lists of control elements or from libraries of control elements. The user may designate initially one or more model objects for which the object control rig will be associated. Alternately, the user may design a rig and thereafter designate one or more objects or object parts with which to associate the rig. In one aspect, the rig is associated with the one or more animation objects such that when the one or more animation objects are loaded in an animation object manipulation tool or other tool, the rig is made available for selection by a user. In certain aspects, when saved, the rig is stored with data for the associated object or objects.

Advantageously, the user is able to select control elements intended to be used in different manipulation modes when constructing the rig. For example, the user may select one or more control elements typically used in a translation mode and/or one or more control elements typically used in a rotation mode and/or one or more control elements typically used in different manipulation modes. In this manner, a user is able to custom design a rig of control elements that can be applied to a model object, whether or not those control elements were specifically designed for that object. Advantageously, the ability to specify arbitrary sets of control elements for use with a model object frees users from the constraints typical in prior systems and methods.

In step 120, upon selection of a rig by a user, the control elements included in the selected rig are enabled. For example, when a rig is selected, the control elements, and any required attributes or parameters are loaded into the current tool. In some cases, multiple rigs may have been associated with the same object or set of objects by a user. In this case, a user may select a rig from a list of rigs, e.g., in a picklist or dropdown menu on a graphical user interface window.

Figure 3:
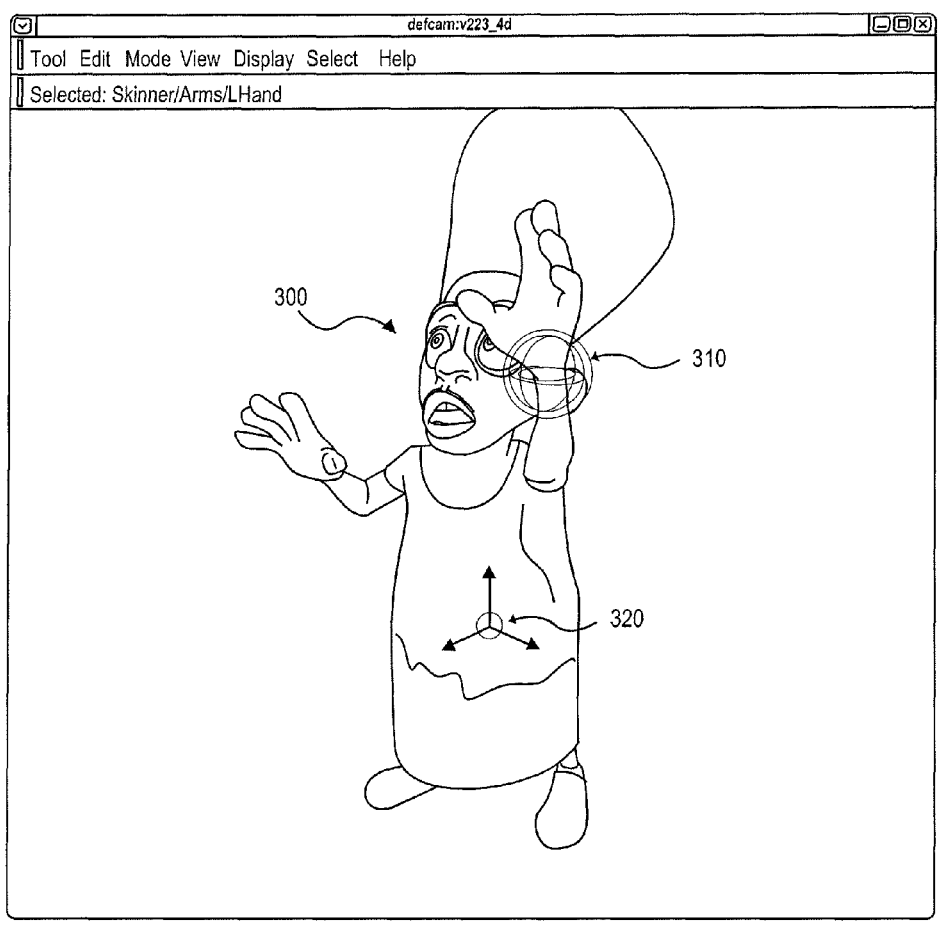
FIG. 3 illustrates an example of a character (e.g., animation object) having visual representations displayed for two different enabled animation control elements.

In step 130, one or more of the visual representations of the control elements included in the selected rig are displayed. In one aspect, the visual representations are all displayed when the rig is selected in step 120. In another aspect, one or more of the visual representations are displayed when the user mouses-over an object or a portion of an object having an object control element associated therewith. In another aspect, a visual representation is displayed when a user selects an object or part of an object having an object control element associated therewith. FIG. 3 illustrates a character 300 (e.g., animation object) having visual representations displayed for two different enabled animation control elements. As shown, a rotate control element 310 is associated with the characters left wrist and a translate element 320 is associated with the character's belly region. In this instance, a user is able to select each of the displayed animation control elements and manipulate the character.

In step 140, a user manipulates an object using an enabled object control element. For example, in one aspect, a user selects a visual representation of an object control element and manipulates the associated object. Once enabled, an object control element may be used to manipulate the object according to the rules, attributes and parameters associated with the control element and object. The user may, of course, switch to a different rig if desired, or they may choose to deselect a rig and otherwise manipulate an object as is possible with the current tool they may be using.

As used herein a control element includes any element usable in an animation object manipulation tool or similar tool and which provides an ability to manipulate a model object and/or provides feedback on the extent of a current manipulation. A control element might include, for example, animation control variables. A control element can be of any type, e.g., usable in a any particular mode of manipulation. For example, object control element types can include translation elements, rotate elements, scaling elements, and bend elements. It should be appreciated that the model objects with which a control element may be associated include animate objects and/or inanimate objects in a scene. Specific examples include characters in a scene.

Figure 2:
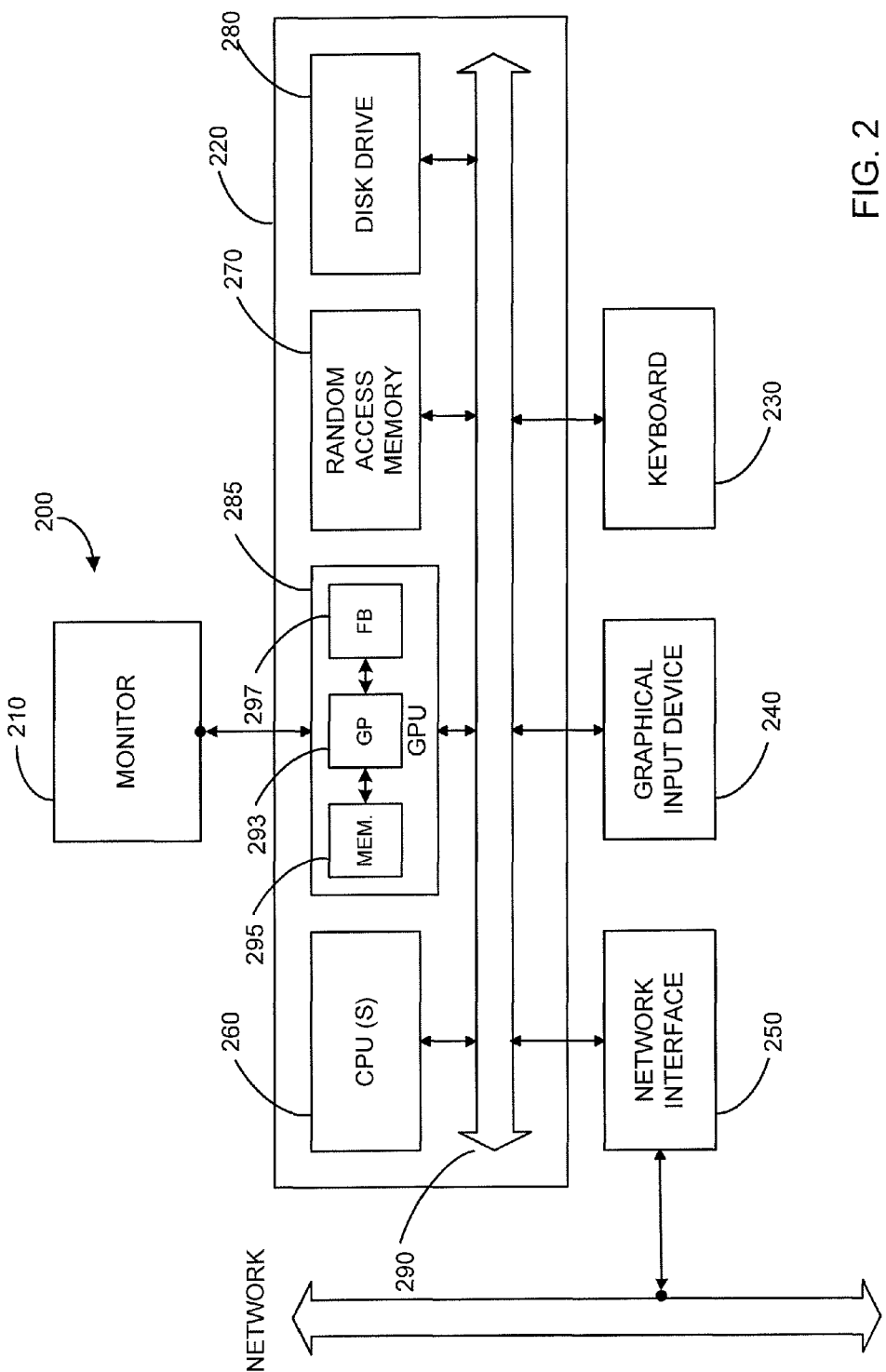
FIG. 2 is a block diagram of a computer system that may be used to practice embodiments of the present invention.

FIG. 2 is a block diagram of a computer system that may be used to practice embodiments of the present invention. FIG. 2 is merely illustrative of an embodiment incorporating the present invention and does not limit the scope of the invention as recited in the claims. One of ordinary skill in the art would recognize other variations, modifications, and alternatives.

In one embodiment, computer system 200 typically includes a monitor 210, computer 220, a keyboard 230, a user input device 240, computer interfaces 250, and the like.

In various embodiments, user input device 240 is typically embodied as a computer mouse, a trackball, a track pad, a joystick, wireless remote, drawing tablet, voice command system, eye tracking system, and the like. User input device 240 typically allows a user to select objects, icons, text and the like that appear on the monitor 210 via a command such as a click of a button or the like.

Embodiments of computer interfaces 250 typically include an Ethernet card, a modem (telephone, satellite, cable, ISDN), (asynchronous) digital subscriber line (DSL) unit, FireWire interface, USB interface, and the like. For example, computer interfaces 250 may be coupled to a computer network, to a FireWire bus, or the like. In other embodiments, computer interfaces 250 may be physically integrated on the motherboard of computer 220, and may be a software program, such as soft DSL, or the like.

In various embodiments, computer 220 typically includes familiar computer components such as a processor 260, and memory storage devices, such as a random access memory (RAM) 270, disk drives 280, a GPU 285, and system bus 290 interconnecting the above components.

In some embodiment, computer 220 includes one or more Xeon microprocessors from Intel. Further, one embodiment, computer 220 includes a UNIX-based operating system.

RAM 270 and disk drive 280 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 285 may be any conventional graphics processing unit that may be user programmable. Such GPUs are available from NVIDIA, ATI, and other vendors. In this example, GPU 285 includes a graphics processor 293, a number of memories and/or registers 295, and a number of frame buffers 297.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Embodiments and aspects of the present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for manipulating animation objects, the method comprising:
    receiving, at one or more computer systems, information associating a plurality of object controls with an animation object;
    generating, with one or more processors associated with the one or more computer systems, information configured to enable manipulation of the animation object using the plurality of animation controls responsive to a selection of the plurality of object controls;
    generating, with the one or more processors associated with the one or more computer systems, information configured to display one or more of visual representations of each object control in the plurality of object controls at a portion of the animation object responsive to a user action associated with the portion of the animation object, wherein at least one object control in the plurality of object controls configured to be displayed at the portion of the animation object affects a scope of the animation object different from a scope associated with the portion of the animation object; and
    generating, with the one or more processors associated with the one or more computer systems, information configured to manipulate at least one scope of the animation object responsive to a user selection of a visual representation of an object control in the plurality of object controls that displayed at the portion of the one or more animation objects.

2. The method of claim 1, wherein the selection of the plurality of object controls comprises a user selection of at least one object control in the plurality of object controls.

3. The method of claim 1, wherein the selection of the plurality of object controls comprises a user selection of the more animation object.

4. The method of claim 1, wherein the selection of the plurality of object controls comprises a user selection a user selection of the plurality of object controls from a list of one or more sets of object controls.

5. The method of claim 1, wherein the plurality of object controls include at least one type of translation elements, rotate elements, scaling elements, or bend elements.

6. The method of claim 1, wherein the plurality of object controls includes different object control element types having different operation modes in addition to differing operation scopes.

7. The method of claim 1, wherein the user action includes mousing over the animation object, whereupon a visual representation of an object control in the plurality of object controls associated with the animation object is displayed.

8. The method of claim 1, wherein the animation object comprises one of an inanimate object or a part of an animate object or a geometric primitive.

9. The method of claim 1, further comprising:
    generating animation information in response to manipulating the at least one scope of the animation object; and
    rendering an image of the animation object based on the animation information.

10. The method of claim 1, further comprising:
    generating animation information in response to manipulating the at least one scope of the animation object; and
    rendering an image of the animation object based on the animation information.

11. A non-transitory computer-readable medium storing computer-executable code for manipulating animation objects, the non-transitory computer-readable medium comprising:
    code for receiving information associating a plurality of object controls with an animation object;
    code for generating information configured to enable manipulation of the animation object using the plurality of animation controls responsive to a selection of the plurality of object controls;
    code for generating information configured to display one or more of visual representations of each object control in the plurality of object controls at a portion of the animation object responsive to a user action associated with the portion of the animation object, wherein at least one object control in the plurality of object controls configured to be displayed at the portion of the animation object affects a scope of the animation object different from a scope associated with the portion of the animation object; and
    code for generating information configured to manipulate at least one scope of the animation object responsive to a user selection of a visual representation of an object control in the plurality of object controls that displayed at the portion of the one or more animation objects.

12. The non-transitory computer-readable medium of claim 11, wherein the selection of the plurality of object controls comprises a user selection of at least one object control in the plurality of object controls.

13. The non-transitory computer-readable medium of claim 11, wherein the selection of the plurality of object controls comprises a user selection of the more animation object.

14. The non-transitory computer-readable medium of claim 11, wherein the selection of the plurality of object controls comprises a user selection a user selection of the plurality of object controls from a list of one or more sets of object controls.

15. The non-transitory computer-readable medium of claim 11, wherein the plurality of object controls include at least one type of translation elements, rotate elements, scaling elements, or bend elements.

16. The non-transitory computer-readable medium of claim 11, wherein the plurality of object controls includes different object control element types having different operation modes in addition to differing operation scopes.

17. The non-transitory computer-readable medium of claim 11, wherein the user action includes mousing over the animation object, whereupon a visual representation of an object control in the plurality of object controls associated with the animation object is displayed.

18. The non-transitory computer-readable medium of claim 11, wherein the animation object comprises one of an inanimate object or a part of an animate object or a geometric primitive.

19. The non-transitory computer-readable medium of claim 11, further comprising:
   code for generating animation information in response to manipulating the at least one scope of the animation object; and
   code for rendering an image of the animation object based on the animation information.

20. A system for manipulating animation objects, the system comprising:
   a processor; and
   a memory in communication with the processor and configured to store a set of instructions which when executed by the processor configure the processor to:
   receive information associating a plurality of object controls with an animation object;
   generate information configured to enable manipulation of the animation object using the plurality of animation controls responsive to a selection of the plurality of object controls;
   generate information configured to display one or more of visual representations of each object control in the plurality of object controls at a portion of the animation object responsive to a user action associated with the portion of the animation object, wherein at least one object control in the plurality of object controls configured to be displayed at the portion of the animation object affects a scope of the animation object different from a scope associated with the portion of the animation object; and
   generate information configured to manipulate at least one scope of the animation object responsive to a user selection of a visual representation of an object control in the plurality of object controls that displayed at the portion of the one or more animation objects.

\* \* \* \* \*